United States Patent
Nawata

(10) Patent No.: US 6,968,162 B2
(45) Date of Patent: Nov. 22, 2005

(54) SATELLITE COMMUNICATION TRANSMISSION CONTROL SYSTEM AND SMALL APERTURE TERMINAL

(75) Inventor: Hizuru Nawata, Tokyo (JP)

(73) Assignee: NEC Corporation, Tokyo (JP)

( * ) Notice: Subject to any disclaimer, the term of this patent is extended or adjusted under 35 U.S.C. 154(b) by 402 days.

(21) Appl. No.: 10/106,501

(22) Filed: Mar. 27, 2002

(65) Prior Publication Data

US 2002/0142718 A1 Oct. 3, 2002

(30) Foreign Application Priority Data

Mar. 28, 2001 (JP) ........................................ 2001-093595

(51) Int. Cl.⁷ ............................................... H04B 1/18
(52) U.S. Cl. ........................ 455/121; 455/118; 455/119
(58) Field of Search ............................... 455/12.1, 13.1, 455/13.2, 7, 17, 427, 118, 119, 120, 121, 126, 131

(56) References Cited

U.S. PATENT DOCUMENTS

| | | | | |
|---|---|---|---|---|
| 4,932,072 A | * | 6/1990 | Toko | 455/76 |
| 5,574,998 A | * | 11/1996 | Andoh | 455/182.2 |
| 5,940,744 A | * | 8/1999 | Uda | 455/75 |
| 5,995,812 A | * | 11/1999 | Soleimani et al. | 455/119 |
| 6,047,003 A | * | 4/2000 | Han | 370/509 |
| 6,366,620 B1 | * | 4/2002 | Jackson et al. | 375/308 |

FOREIGN PATENT DOCUMENTS

| | | |
|---|---|---|
| JP | 57-174953 A | 10/1982 |
| JP | 60-59778 B2 | 12/1985 |
| JP | 64-1335 A | 1/1989 |
| JP | 06-006275 A | 1/1994 |
| JP | 06-244783 A | 9/1994 |
| JP | 08-018610 A | 1/1996 |
| JP | 9-74589 A | 3/1997 |
| JP | 9-135178 A | 5/1997 |
| JP | 10-023093 A | 1/1998 |
| JP | 2944480 B2 | 6/1999 |
| JP | 2000-244355 A | 9/2000 |
| JP | 2000-295135 A | 10/2000 |
| JP | 2001-016126 A | 1/2001 |
| JP | 2001-036386 A | 2/2001 |
| JP | 2001-077670 A | 3/2001 |

* cited by examiner

Primary Examiner—Sonny Trinh
Assistant Examiner—Sam Bhattacharya
(74) Attorney, Agent, or Firm—Sughrue Mion, PLLC

(57) ABSTRACT

A satellite communication transmission control system includes one central station, a plurality of small aperture terminals, and one communication satellite serving as a repeater for the central and aperture terminals. This system performs communication via a frequency division multiple access communication channel. The central station includes a modulator for transmitting via a common channel a signal for controlling/monitoring the small aperture terminals on the basis of a stable clock signal. Each aperture terminal includes a modulator, transmission frequency converter, antenna/RF device, reception frequency converter, demodulator, and frequency comparator. The modulator modulates communication information. The transmission frequency converter frequency-converts a modulated wave from the modulator into a carrier signal (modulated carrier). The reception frequency converter frequency-converts the modulated carrier. The demodulator demodulates a signal received via the common channel and outputs a reception clock. The frequency comparator detects the frequency error of a local oscillator, and generates a control signal for stopping transmission of the modulated carrier until the frequency error falls within a preset tolerance range.

13 Claims, 9 Drawing Sheets

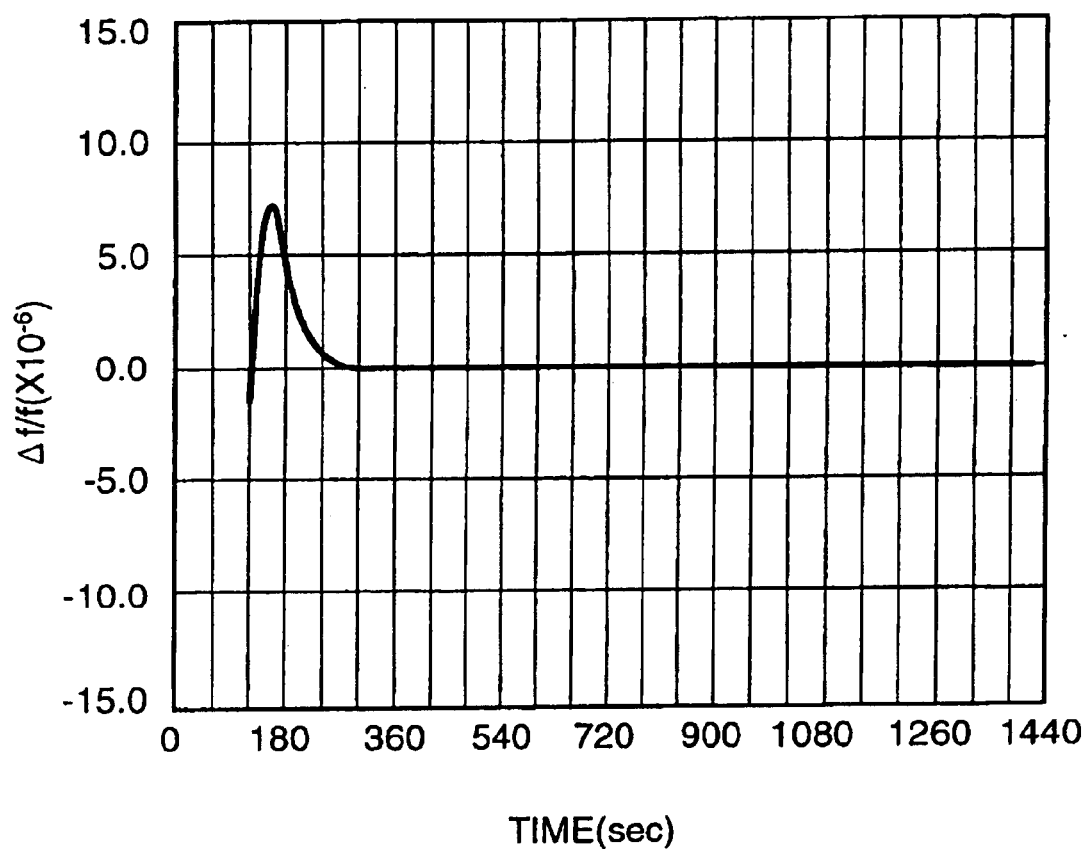

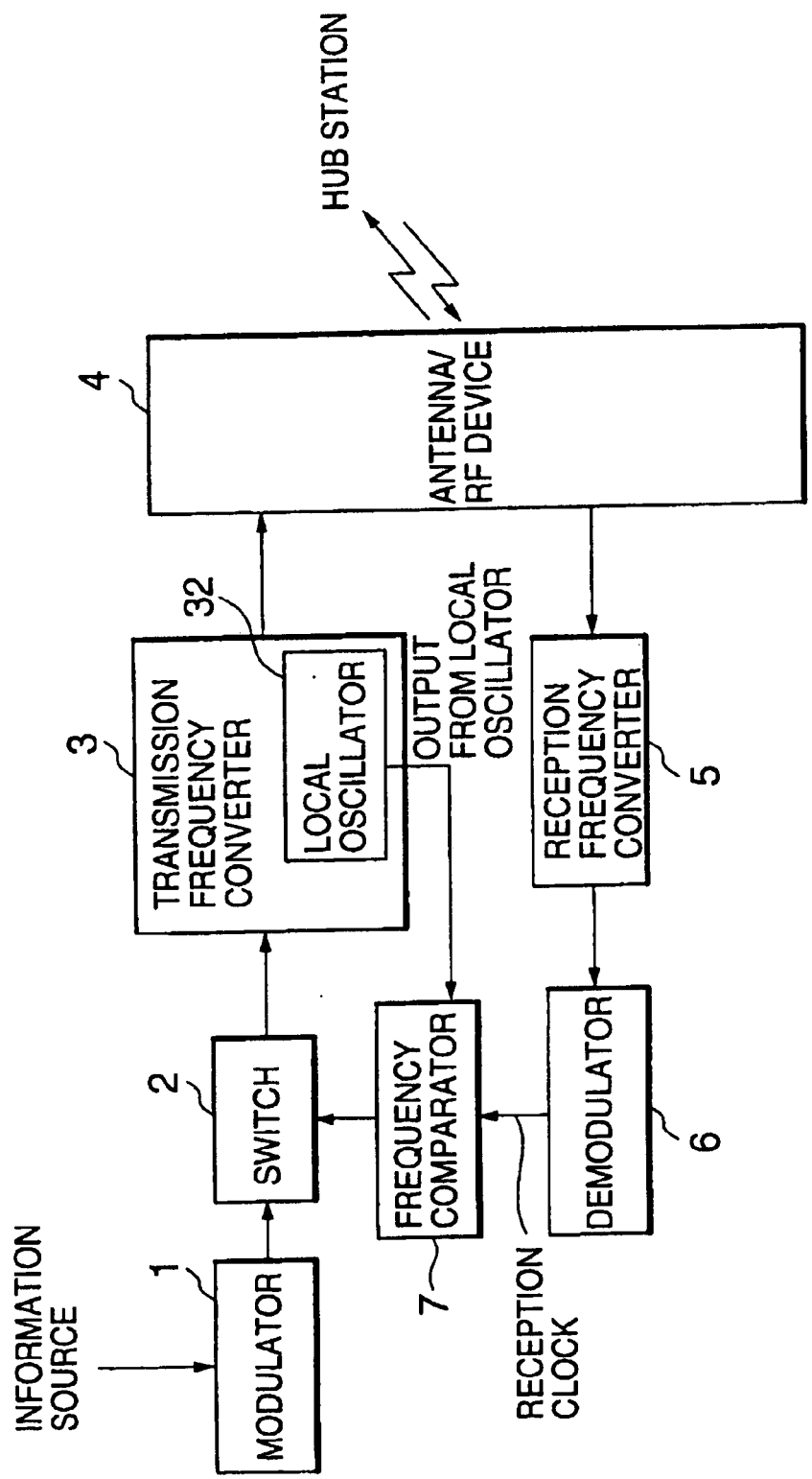

SATELLITE COMMUNICATION TRANSMISSION CONTROL SYSTEM AND SMALL APERTURE TERMINAL

BACKGROUND OF THE INVENTION

1. Field of the Invention

The present invention relates to a digital satellite communication system and, more particularly, to a satellite communication transmission control system which uses one central station and a plurality of small aperture terminals and performs frequency division multiple access communication via a satellite repeater, and a small aperture terminal.

2. Description of the Prior Art

There is known a satellite communication method for performing frequency division multiple access (to be referred to as FDMA hereinafter) communication of exchanging modulated carriers between one central station and a plurality of aperture terminals or between the plurality of aperture terminals via a satellite repeater in a digital satellite communication system constituted by the central station and plurality of aperture terminals.

In the FDMA satellite communication system, the precision of the center frequencies of modulated carriers must be set sufficiently high so as not to influence modulated carriers adjacent along the frequency axis of a satellite repeater. In other words, the central station and aperture terminals are always inhibited from transmitting unstable signals in transmitting modulated carriers.

When a plurality of modulated carriers A, B, and C are emitted toward a satellite repeater, as shown in FIG. 1A, no problem arises as far as the center frequencies of the modulated carriers have high precision. If, however, the center frequency of a given modulated carrier suffers a large error, this modulated carrier interferes with an adjacent modulated carrier and is adversely affected by itself, as shown in FIG. 1B.

In conventional radio communication, a known transmission control system in a transmitter is to prevent transmission of a transient unstable transmission signal upon turning on the transmitter.

For example, Japanese Examined Patent Publication No. 60-056778 discloses a radio transmitter which comprises a timer (power-on timer) for turning on only the power supply of a circuit on an antenna side with a delay in order to prevent any error caused by partial oscillation during feedback from the crystal oscillation circuit to the antenna upon turning on the power supply, and which transmits a transmission signal from the antenna after a crystal oscillation circuit is turned on. Japanese Patent No. 2944480 discloses a transmission output control system in which a transmitter comprises a controller (CPU), hard controller, and power-on reset circuit (power-on timer), a transmission output is controlled by the hard controller upon turning on the power supply, and after the controller (CPU) is activated, the transmission output is controlled in accordance with reception level information from a partner receiver.

Japanese Unexamined Patent Publication No. 64-001335 discloses a transmitter with a noise generation prevention circuit that detects noise generated from a digital phase comparator in the automatic phase controller (APC) of the transmitter, and turns on the output-side switch of the transmitter a predetermined time after stopping generation of noise, in order not to generate noise on the receiving side even if the voltage-controlled oscillator (VCO) of the APC having a reference frequency oscillator is activated from a frequency different from the center frequency based on the reference frequency oscillator when the transmitter is turned on. Japanese Unexamined Patent Publication No. 09-135178 discloses a transmission output control system which uses an alarm detection circuit for monitoring an output from a phase detector (phase comparator) in a similar APC and controlling ON/OFF switching of transmission, and a power-on reset circuit (power-on timer), and which inhibits ON-switching of transmission by the power-on reset circuit (power-on timer) upon turning on the power supply, thereby preventing fluctuations in transmission output caused by unstable operation of the alarm detection circuit.

As described above, each aperture terminal or the like executes communication by the FDMA method via a satellite repeater in the digital satellite communication system for performing communication between one central station and a plurality of aperture terminals or between a plurality of aperture terminals via a satellite repeater. Transmission signals must be transmitted while their frequency bands are prevented from overlapping each other. Particularly, transmission of an unstable transmission signal must be prevented upon turning on the power supply.

For example, the frequency band of the Ku band often used in a satellite communication system in which the aperture terminal is formed from a very small aperture terminal ranges from 14.0 GHz to 14.5 GHz in uplink to a satellite. The transmission frequency error of the modulated carrier is 1 ppm ($=1 \times 10^{-6}$). This error corresponds to 14 kHz, which cannot be ignored in a modulated carrier having a modulation rate of 32 kbps in widely spread ADPCM voice communication digital satellite communication. The tolerance transmission frequency error as the error of the transmission frequency allowed in this communication system is about ±0.1 ppm or less.

The precision of the transmission frequency of a modulated wave emitted by an aperture terminal depends on a transmission frequency converter (to be referred as a U/C (Up Converter) hereinafter) in the transmitting section. The U/C has a local oscillator, which determines the center transmission frequency of the modulated carrier.

The local oscillator is formed from a synthesizer type PLL circuit. A crystal oscillator having a frequency of several ten MHz (e.g., 10 MHz) is used as an oscillation source. This frequency is multiplied and used by the local oscillator (e.g., for a 10-MHz oscillation source, a multiple of 1,400 yields 14 GHz). If the oscillation source has an error of 1 ppm, this error is also multiplied and appears as an error of 1 ppm even in the local oscillator.

The precision of the oscillation source determines the center transmission frequency of the modulated carrier. For this reason, the crystal oscillator serving as an oscillation source must maintain high precision.

In general, a temperature-compensated crystal oscillator called OCXO (Oven Controlled Crystal Oscillator) (to be also referred to as an OCXO hereinafter) is widely used as a crystal oscillator which can maintain high precision. The OCXO is a thermostatic crystal oscillator which incorporates a heater for generating heat, has a crystal oscillator or crystal oscillation circuit confined in a stable-temperature oven, and realizes very high frequency stability. In general, the OCXO precision can be kept at about ±0.005 ppm to ±0.01 ppm.

When the OCXO is activated (circuit is powered on), the frequency precision is as low as several ten ppm until the internal oven is warmed up and serves as a thermostat to obtain a stable temperature. The startup time until the frequency is stabilized is several min under the present circumstances.

In other words, during several min until the frequency is stabilized after power-on operation, the OCXO cannot be used as the oscillation source of the PLL constituting the local oscillator. If a transmission signal is transmitted during this period, interference with an adjacent carrier occurs.

FIG. 2 is a graph showing an example of the oscillation frequency error of the OCXO upon power-on operation. The abscissa represents the lapse time after the power supply is turned on, and the ordinate represents the error from a rated frequency. For example, if a modulated carrier is emitted in the presence of an error of 10 ppm, the center frequency of the modulated carrier shifts to a frequency different by 140 kHz in the 14-GHz band, and the carrier interferes with an adjacent carrier.

The transmission control system disclosed in the above reference has been known as a conventional technique for preventing transmission of an invalid signal upon turning on the power supply. The radio transmitter disclosed in Japanese Examined Patent Publication No. 60-059778 uses a power-on timer for inhibiting transmission only during a predetermined time simply after the power supply is turned on. This control system starts transmission after a predetermined time even if the oscillator cannot reach a steady state owing to any fault and the frequency error from an original frequency is large. This system cannot be applied to FDMA transmission control. The transmission output control system disclosed in Japanese Patent No. 2944480 uses information received from a partner receiver. However, the received information is used for only the reception level so as to control the transmission output level. After the power-on timer operates, a transmission signal is output regardless of a frequency error from the center frequency of a transmission carrier. For example, even if an oscillator for determining a transmission frequency malfunctions and oscillates at an abnormal frequency, a transmission signal is output at the abnormal frequency after a predetermined time. Also, this control system cannot be applied to FDMA transmission control.

The transmission control systems disclosed in Japanese Unexamined Patent Publication Nos. 64-001335 and 09-135178 monitor an output (APC voltage) from a phase comparator. Even when the frequency of a reference frequency oscillator suffers a large error of, e.g., about several ten ppm from a specified frequency, the frequency is determined normal. This control system undesirably transmits a carrier having a large frequency error.

From this, the prior arts cannot be applied to transmission control of the modulator of a central station when FDMA communication is performed via a satellite repeater between one central station and a plurality of aperture terminals or between the plurality of aperture terminals in a digital satellite communication system constructed by the central station, the plurality of very small aperture terminals, and one communication satellite.

The influence of the frequency error of a transmission signal from each aperture terminal can be avoided by setting a wide occupied bandwidth usable in the satellite repeater. This is disadvantageous in effective use of the frequency and the cost.

SUMMARY OF THE INVENTION

The present invention has been made in consideration of the conventional situation, and has as its object to provide a satellite communication transmission control system and small aperture terminal capable of preventing transmission of a modulated carrier in a power-on period during which the frequency of a local oscillator becomes unstable.

To achieve the above object, according to the first aspect of the present invention, there is provided a satellite communication transmission control system which comprises one central station, a plurality of small aperture terminals, and one communication satellite serving as a repeater for the central station and the aperture terminals, and performs communication via a frequency division multiple access communication channel, wherein the central station comprises a modulator for transmitting via a common channel a signal for controlling/monitoring the small aperture terminals on the basis of a stable clock signal, and each of the aperture terminals comprises a modulator for modulating communication information from an information source, a transmission frequency converter for frequency-converting a modulated wave from the modulator into a carrier signal (modulated carrier), an antenna/RF device for exchanging signals between the aperture terminal and the central station, a reception frequency converter for frequency-converting a modulated carrier from the central station, a demodulator for demodulating a signal received via the common channel out of a frequency-converted received signal and outputting a reception clock, and a frequency comparator for detecting a frequency error of a local oscillator arranged in the transmission frequency converter by using a clock signal from the demodulator as a reference upon power-on operation, and generating a control signal for stopping transmission of the modulated carrier until the frequency error falls within a preset tolerance range.

The small aperture terminal defined in the first aspect further comprises a switch arranged on an output side of the modulator, and the switch is kept off by the control signal from the frequency comparator until the frequency error falls within the preset error range.

The small aperture terminal defined in the first aspect further comprises a frequency conversion mixer arranged in the transmission frequency converter so as to multiply an output from the modulator by an output from the local oscillator, and a switch inserted in a signal path of a local signal from the local oscillator to the mixer, and the switch is kept off by the control signal from the frequency comparator until the frequency error falls within the preset error range.

The small aperture terminal defined in the first aspect further comprises a modulator local oscillator arranged for the modulator, and a switch inserted in a signal path of a local signal from the modulator local oscillator to the modulator, and the switch is kept off by the control signal from the frequency comparator until the frequency error falls within the preset error range.

The frequency comparator defined in the first aspect comprises a tolerance range setting unit for setting a frequency error range, a timer for setting a predetermined time specified by the clock signal as a gate ON period, a counter for counting outputs from the local oscillator in the gate ON period, and a comparator for comparing a count value of the counter with a preset tolerance range.

The local oscillator defined in the first aspect includes a synthesizer using a temperature-compensated crystal oscillator as an oscillation source, and outputs a multiplied output of the temperature-compensated crystal oscillator.

As is apparent from the above aspects, according to the present invention, transmission of an unstable modulated carrier caused by variations in the frequency of the local oscillator immediately after power-on operation can be prevented by the small aperture terminal on the basis of a stable clock signal obtained from a signal received from the central station via the control/monitoring common channel. The occupied bandwidth of the satellite repeater for outputting a modulated carrier need not be widened, and the frequency band can be effectively used. Interference with an adjacent modulated carrier can also be prevented.

The present invention executes absolute comparison between an output from the local oscillator and a stable reference clock, and controls transmission of a modulated carrier. The modulated carrier is transmitted immediately when the frequency error falls within a predetermined frequency error range. Compared to a method of transmitting a modulated carrier a predetermined time after the timer operates upon power-on operation, the present invention achieves the following prominent effects. That is, transmission of a modulated carrier can be prevented without failing to detect oscillation at an abnormal frequency due to a fault in an oscillator for determining an output frequency. In addition, transmission can be performed after the output frequency recovers to a normal one.

The above and many other objects, features and advantages of the present invention will become manifest to those skilled in the art upon making reference to the following detailed description and accompanying drawings in which preferred embodiments incorporating the principle of the present invention are shown by way of illustrative examples.

BRIEF DESCRIPTION OF THE DRAWINGS

FIG. 2 is a graph showing an example of the oscillation frequency error of an OCXO upon power-on operation;

FIG. 4 is a block diagram showing an arrangement of the VSAT station in a satellite communication transmission control system of the present invention;

DETAILED DESCRIPTION OF THE PREFERRED EMBODIMENT

The satellite communication transmission control system for a digital satellite communication system constituted by one central station (to be referred to as a HUB station hereinafter), a plurality of very small aperture terminals (VSAT; to be referred to as VSAT stations hereinafter), and a communication satellite (to be referred to as a SAT) serving as repeater for the HUB and VSAT stations will be described in detail as a preferred embodiment of the present invention with reference to the accompanying drawings.

Figure 1A:
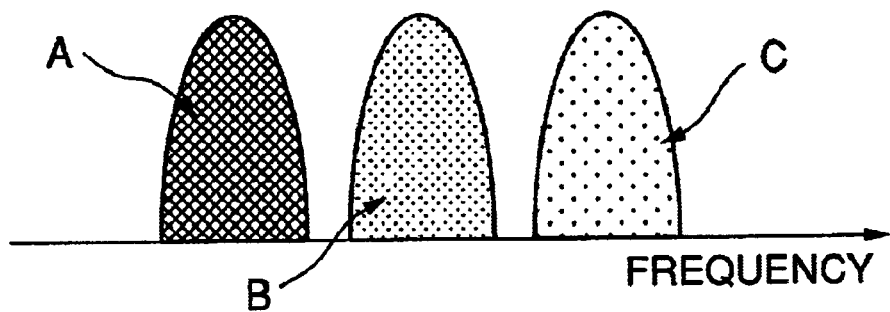
FIGS. 1A and 1B are views showing examples of the frequency allocation of a modulated carrier in the FDMA system.
Figure 1B:
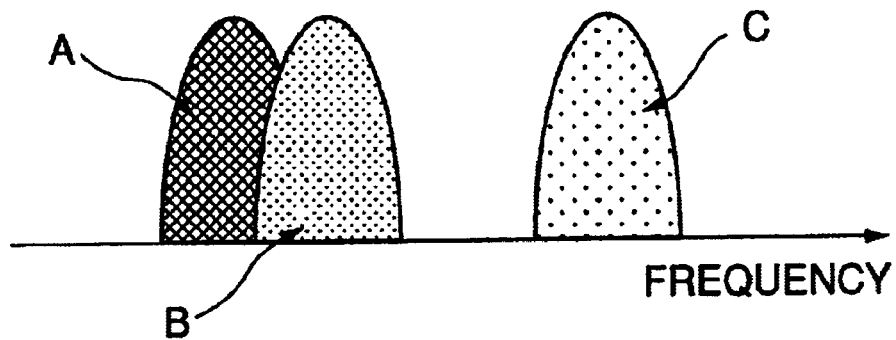
Figure 3A:
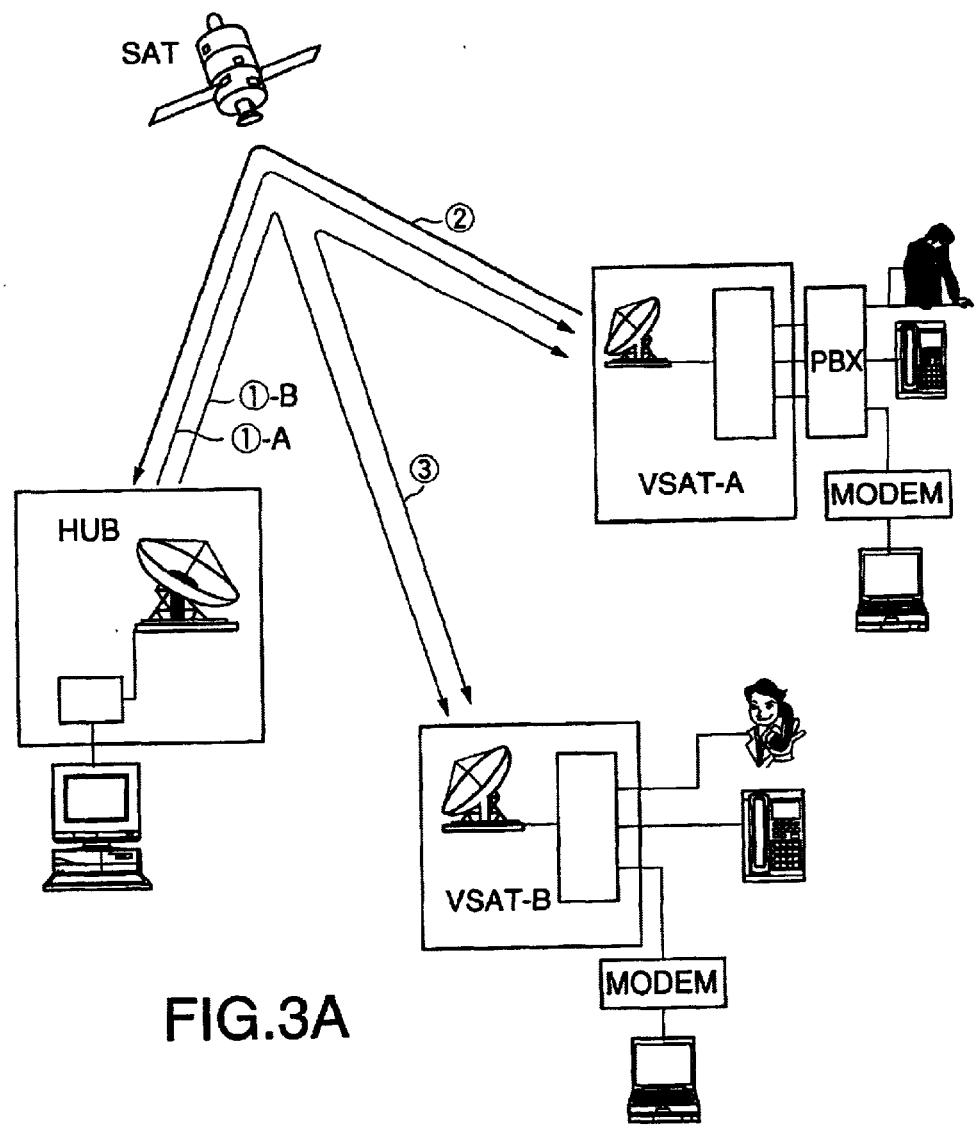
FIGS. 3A and 3B are conceptual views showing the overall arrangement and communication function of a digital satellite communication system according to the present invention that is constituted by one HUB station, a plurality of VSAT stations, and one communication satellite.
Figure 3B:
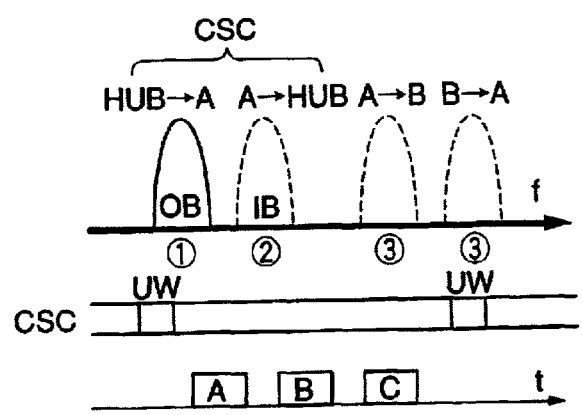

FIGS. 3A and 3B are conceptual views showing the overall arrangement and communication function of a digital satellite communication system according to the present invention using one HUB station, a plurality of VSAT stations, and one SAT. As shown in FIG. 3A, the digital satellite communication system is constituted by a SAT having a repeater, a HUB station (HUB) connected to a central computer and information terminal, and a plurality of VSAT stations (VSAT-A, VSAT-B, . . . ) each connected to a personal computer and an information terminal such as a telephone. FDMA (Frequency Division Multiple Access) communication is performed via the satellite repeater between the HUB station and a plurality of VSAT stations or between a plurality of VSAT stations.

This digital satellite communication system uses a common signaling channel (to be referred to as a CSC) serving as a common channel for controlling/monitoring via the satellite repeater all VSAT stations which participate in satellite communication from the HUB station, and data communication channels between the VSAT stations.

The common channel (CSC channel) is a channel for performing communication by using a single frequency between a plurality of stations by time division. This channel executes communication using the TDM (Time Division Multiplexing) method, TDMA (Time Division Multiple Access) method, or slotted ALOHA method.

As shown in FIG. 3B, the common channel (CSC channel) is made up of an OB (Out Bound) from the HUB station to the VSAT station and an IB (In Bound) from the VSAT station to the HUB station. Time division control signals having a UW (Unique Word) frame structure are exchanged via OB and IB using different frequency bands.

The VSAT stations are controlled/monitored by the HUB station via the CSC channel. The VSAT stations exchange modulated carriers between them and perform FDMA communication by using channels of different data communication frequency bands at frequencies different from that of the CSC channel. The communication control procedures are as follows.

As shown in FIG. 3A, the HUB station always uses the OB of the CSC channel to monitor/control the VSAT stations by health check control of each VSAT station, channel assignment control upon reception of a request from the VSAT station, and the like (see arrows ①-A and ①-B). For example, when a request for communication with the VSAT station VSAT-B occurs in the VSAT station VSAT-A, the VSAT station VSAT-A requests assignment of a data communication channel of the HUB station via the IB of the CSC channel (see an arrow ②). Then, the HUB station assigns data communication channels to the VSAT stations VSAT-A and VSAT-B (see arrows ①-A and ①-B). The VSAT stations VSAT-A and VSAT-B bidirectionally communicate with each other by using the different data communication channels assigned by the HUB station (see an arrow ③)

To reliably, stably execute this communication control, the HUB station comprises an oscillator with very high frequency precision that generates a control signal transmission clock to be transmitted to the CSC channel. The HUB station performs very stable operation without any power failure.

FIG. 4 is a block diagram showing the first arrangement example of the VSAT station used in the satellite communication transmission control system of the embodiment. As shown in FIG. 4, the VSAT station comprises a modulator 1 for modulating communication information from an information source, a switch 2 for enabling/disabling a modulated wave from the modulator 1, a transmission frequency converter 3 for frequency-converting the modulated wave from the switch 2 into an FDMA carrier signal (modulated carrier), an antenna/RF device 4 made up of an RF circuit and a parabolic antenna for exchanging signals with the HUB station, a reception frequency converter 5 for frequency-converting a modulated carrier from the HUB station, a demodulator 6 for demodulating a CSC channel signal out of the frequency-converted received signal and outputting a reception clock, and a frequency comparator 7.

The modulator 1 modulates communication information from the VSAT station and outputs a modulated wave. The switch 2 is turned on/off by a control signal from the frequency comparator 7, and controls input of the modulated wave to the transmission frequency converter 3.

The transmission frequency converter 3 functions as an up converter for increasing the frequency of the modulated wave input via the switch 2 to a carrier frequency to be emitted by the VSAT station. The transmission frequency converter 3 incorporates a local oscillator 32.

The local oscillator 32 is formed from a synthesizer type PLL circuit including an OCXO serving as an oscillation source (reference frequency oscillator) using a crystal oscillator. The local oscillator 32 outputs a local signal prepared by multiplying the output frequency of the OCXO (see FIG. 6 for details).

The reception frequency converter 5 has the function of a down converter for decreasing the frequency of a modulated carrier from the antenna/RF device 4 to the operation frequency of the demodulator 6. The demodulator 6 demodulates a CSC channel signal and outputs a reception clock.

The frequency comparator 7 compares the reception clock demodulated from the CSC channel by the demodulator 6 with the frequency of an output from the local oscillator 32. If the error falls within a predetermined frequency error range, the switch 2 is turned on to pass a modulated wave; otherwise, the switch 2 is turned off, and a control signal for inhibiting the modulated wave from passing is output.

Figure 6:
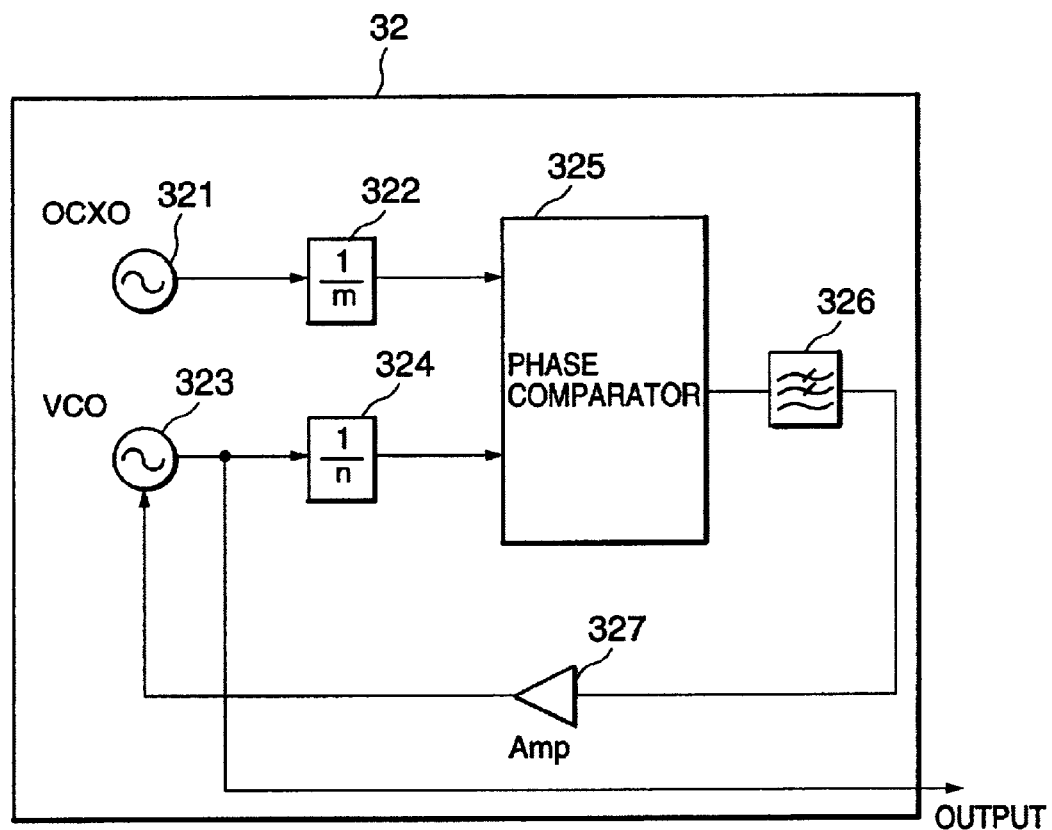
FIG. 6 is a block diagram showing a detailed arrangement of a local oscillator 32 in the VSAT station.

As a modified embodiment, instead of the output from the local oscillator 32, it can be possible to use a sole output from the OCXO 321 itself, shown in FIG. 6.

Figure 5:
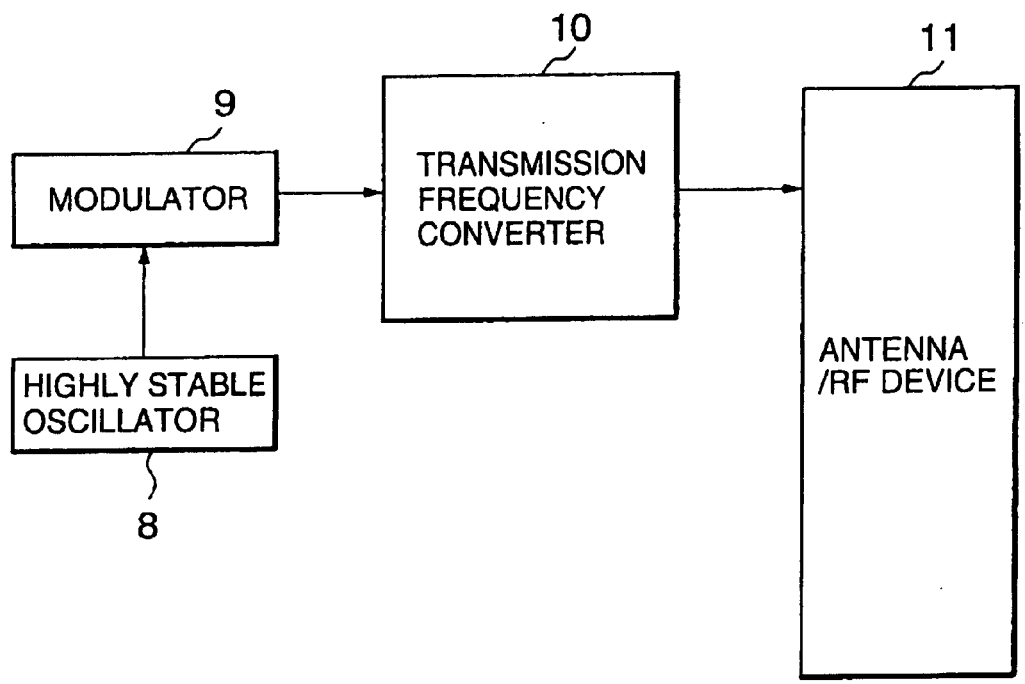
FIG. 5 is a block diagram showing an arrangement of the HUB station in the satellite communication transmission control system of the present invention.

FIG. 5 is a block diagram showing an arrangement of the HUB station used in the satellite communication transmission control system of the embodiment. As shown in FIG. 5, the HUB station is constituted by a modulator 9, a highly stable oscillator 8 for generating a transmission clock, a transmission frequency converter 10, and an antenna/RF device 11.

The modulator 9 is a transmission modulator for a CSC channel control signal or the like that controls/monitors each VSAT station. The control signal or the like is generated based on the transmission clock of a very-high-precision frequency from the oscillator 8. The transmission frequency converter 10 has the function of an up converter for increasing the frequency of the modulated wave such as the control signal to the carrier frequency of a modulated carrier to be emitted by the HUB station. The antenna/RF device 11 has a transmission/reception function with respect to each VSAT station.

FIG. 6 is a block diagram showing a detailed arrangement of the local oscillator 32 in the VSAT station. The local oscillator 32 has a PLL circuit arrangement made up of an OCXO 321, a 1/m frequency divider (m: positive integer) 322 for frequency-dividing an output from the OCXO 321, a voltage-controlled oscillator (VCO) 323, a 1/n frequency divider (n: positive integer) 324 for frequency-dividing an output from the voltage-controlled oscillator 323, a phase comparator 325 for comparing the phases of outputs from these frequency dividers, a low-pass filter for extracting the low frequency component of a phase error signal from the phase comparator 325, and a loop amplifier 327 for amplifying the low frequency signal.

Figure 7:
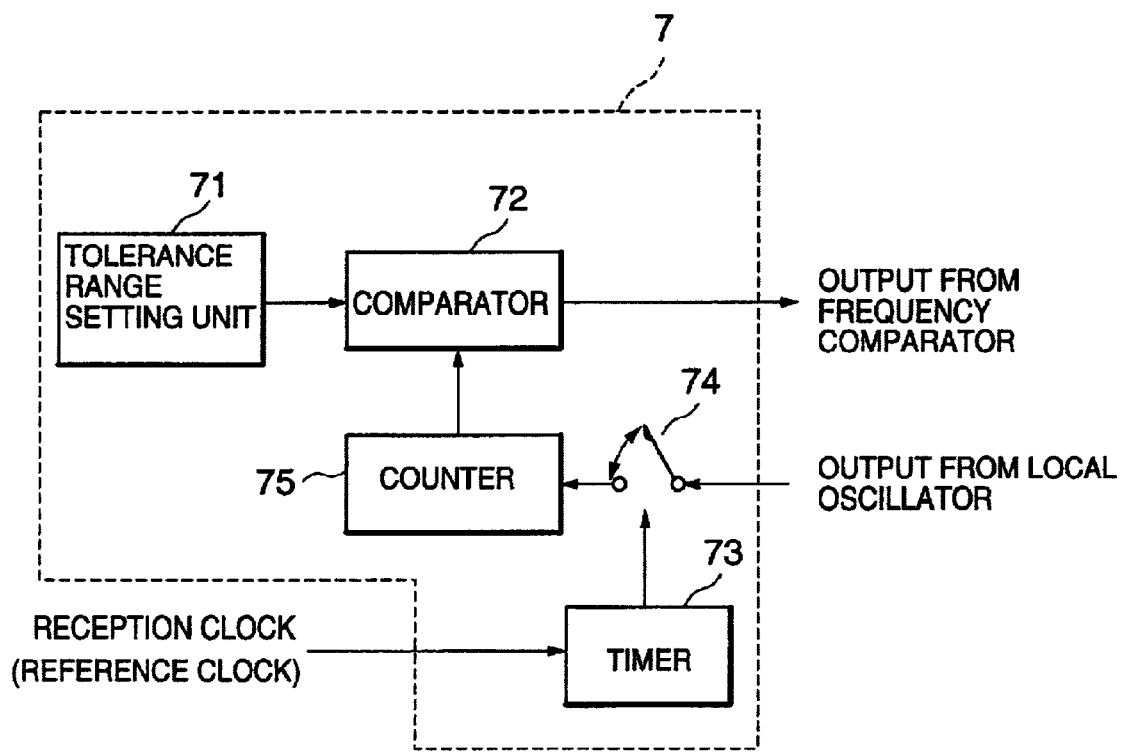
FIG. 7 is a block diagram showing a detailed arrangement of a frequency comparator 7 in the VSAT station.

FIG. 7 is a block diagram showing a detailed arrangement of the frequency comparator 7 in the VSAT station. The frequency comparator 7 is comprised of a tolerance range setting unit 71, comparator 72, timer 73, gate 74, and counter 75. The tolerance range setting unit 71 is a setting unit for setting the range of frequency errors. The timer 73 turns on the gate 74 during a predetermined time specified by a reception clock. The counter 75 counts outputs from the local oscillator 32 during the predetermined time. The comparator 72 outputs the control signal in accordance with whether the count value of the counter 75 falls within the range of values set in advance in the tolerance range setting unit 71.

Startup operation when the station is powered on in the satellite communication transmission control system of the embodiment will be explained.

The VSAT station shown in FIG. 4 is OFF. Communication of the digital satellite communication system via the satellite repeater is in a cold standby state. The switch 2 of the VSAT station is OFF. In this state, the apparatus of the VSAT station is powered on, and then the switch 2 is turned on from the OFF state in response to the power-on operation. The local oscillator 32 constituted by the PLL circuit having the OCXO 321 shown in FIG. 6 as a reference frequency oscillator is also powered on, and the VSAT station is activated.

In the PLL circuit, the voltage-controlled oscillator 323 is controlled by an error signal output from a low-pass filter 326 via the loop amplifier 327 so as to adjust the phase difference between an output signal prepared by frequency-dividing an output from the OCXO 321 by 1/m and an output signal from the voltage-controlled oscillator 323 to a predetermined phase difference determined by the characteristic of the phase comparator 325, typically a phase difference of 0. With this principle, the PLL circuit outputs as a local signal a multiplied output (fvco=n/m·fref) obtained by multiplying the frequency (fvco) of an oscillation output from the voltage-controlled oscillator 323 by n/m (n/m>>1) of the reference oscillation frequency (fref) of the OCXO 321.

The output frequency of the OCXO 321 exhibits low oscillation frequency precision immediately after power-on operation. Stabilization of the oscillation frequency to a specified value requires a predetermined time. Especially in the OCXO, the frequency precision is unstable until the internal oven is warmed up and serves as a thermostat to obtain a stable temperature after the power supply is turned on. Thus, the frequency error is large, and the error of the center frequency for determining a transmission frequency is also large in the local oscillator formed from the PLL circuit which uses the OCXO as a reference frequency oscillator. For example, the frequency precision of the OCXO upon power-on operation may decrease to about several ten ppm.

The frequency (fvco) of an oscillation output from the voltage-controlled oscillator 323 during this period becomes (n/m)×several ten ppm. Hence, the degree of the frequency error increases.

The demodulator 6 in the VSAT station is generally so set as to receive a CSC channel sent from the HUB station. CSC channel reception operation starts immediately after the power supply is turned on. As described above, the CSC channel clock is specified by an oscillator having very high frequency precision. A highly stable control signal is transmitted, and the reception clock at which the control signal is demodulated also has a high-precision frequency.

The frequency comparator 7 compares the frequency of a local signal from the local oscillator 32 with reference to the high-precision reception clock (reference clock) from the demodulator 6. The frequency comparator 7 detects the frequency error, and outputs a control signal to the switch 2. More specifically, if the frequency error falls within a predetermined range, the frequency comparator 7 turns on the switch 2; otherwise, outputs a control signal for turning off the switch 2.

As described above, the frequency error of the OCXO 321 is large immediately after power-on operation, and the frequency error of a multiplied local signal is large. Therefore, the comparison result of the frequency comparator 7 falls outside the error range. The switch 2 in the OFF state in power-on operation is controlled to maintain the OFF state on the basis of the comparison result of the frequency comparator 7. A modulated wave from the modulator 1 to the transmission frequency converter 3 is disabled.

Thereafter, if the frequency error of the local signal decreases and the frequency error of the local signal falls within the error range, the comparison result of the frequency comparator 7 is switched to turn on the switch 2. Then, a modulated wave from the modulator 1 is input to the transmission frequency converter 3. The transmission frequency converter 3 converts the modulated wave into an intermediate frequency signal or radio frequency signal. Finally, a modulated carrier having a high-precision center frequency is output to the antenna/RF device 4, and transmitted from the antenna.

This arrangement and operation prevent transmission of an unstable modulated carrier in activation even if the VSAT station is activated by power-on operation and participates in communication at discretion. VSAT stations can continue and start normal communication via a TDMA communication channel without any interference between them.

The operation of the frequency comparator 7 will be explained with reference to FIG. 7. The frequency comparator in FIG. 7 is based on the principle of counting local signals during a predetermined time determined by the repetitive frequency of a reception clock and determining the deviation between frequencies. More specifically, the timer 73 outputs a pulse signal of a predetermined time by using a high-frequency-precision reception clock as a reference. The gate 74 is turned on only during the pulse period, and the counter 75 counts local signals from the local oscillator 32 in the pulse period. The comparator 72 checks whether the count value of the counter 75 during the period falls within the range of set values such as upper and lower limits set in advance in the tolerance range setting unit 71. Then, the comparator 72 outputs a control signal. An example of numerical values is as follows.

For example, when the predetermined time of the pulse signal is 1 sec, the timer 73 counts 35,000 reception clocks for a 35-kHz reception clock, or 12,800 reception clocks for a 128-kHz reception clock. The timer 73 can output a 1-sec pulse signal.

During 1 sec, the gate 74 is turned on, and outputs from the local oscillator as signals to be measured are counted by the counter. If the nominal frequency of the OCXO is 10 MHz, the count value of the counter must be 10,000,000 after 1 sec. If the count value is 10,000,001, the error is $1 \times 10^{-7}$.

The measured frequency error is compared with the tolerance range set in advance in the tolerance range setting unit 71. Finally, an output from the frequency comparator is generated. For example, the comparator 72 compares the measured frequency error with a frequency error range of, e.g., $\pm \alpha \times 10^{-7}$ set in the tolerance range setting unit 71. The comparator 72 checks whether the measured frequency error falls within the set range, and outputs the above-mentioned control signal as a frequency comparator output. This frequency error detection operation is repeated after power-on operation. If the frequency of the local oscillator gradually stabilizes and falls within this range, the switch 2 is turned on to start predetermined transmission operation.

A binary counter (ripple counter or the like) is used as the timer 73, and is so constituted as to generate and output a frequency-divided output having 50% the duty of the reception clock from a predetermined counter stage. The timer 73 can output a pulse signal which enables repeating the frequency error detection operation. The time of the timer serving as a reference can be appropriately changed. Prolonging this time yields high frequency error measurement precision.

In the above-described embodiment, the switch is arranged on the output side of the modulator as a means for preventing transmission of an unstable modulated carrier. However, this means can be variously modified. Instead of arranging the switch on the output side of the modulator, a means for substantially stopping output of a modulated carrier to the antenna/RF device 4 may be disposed.

Figure 8:
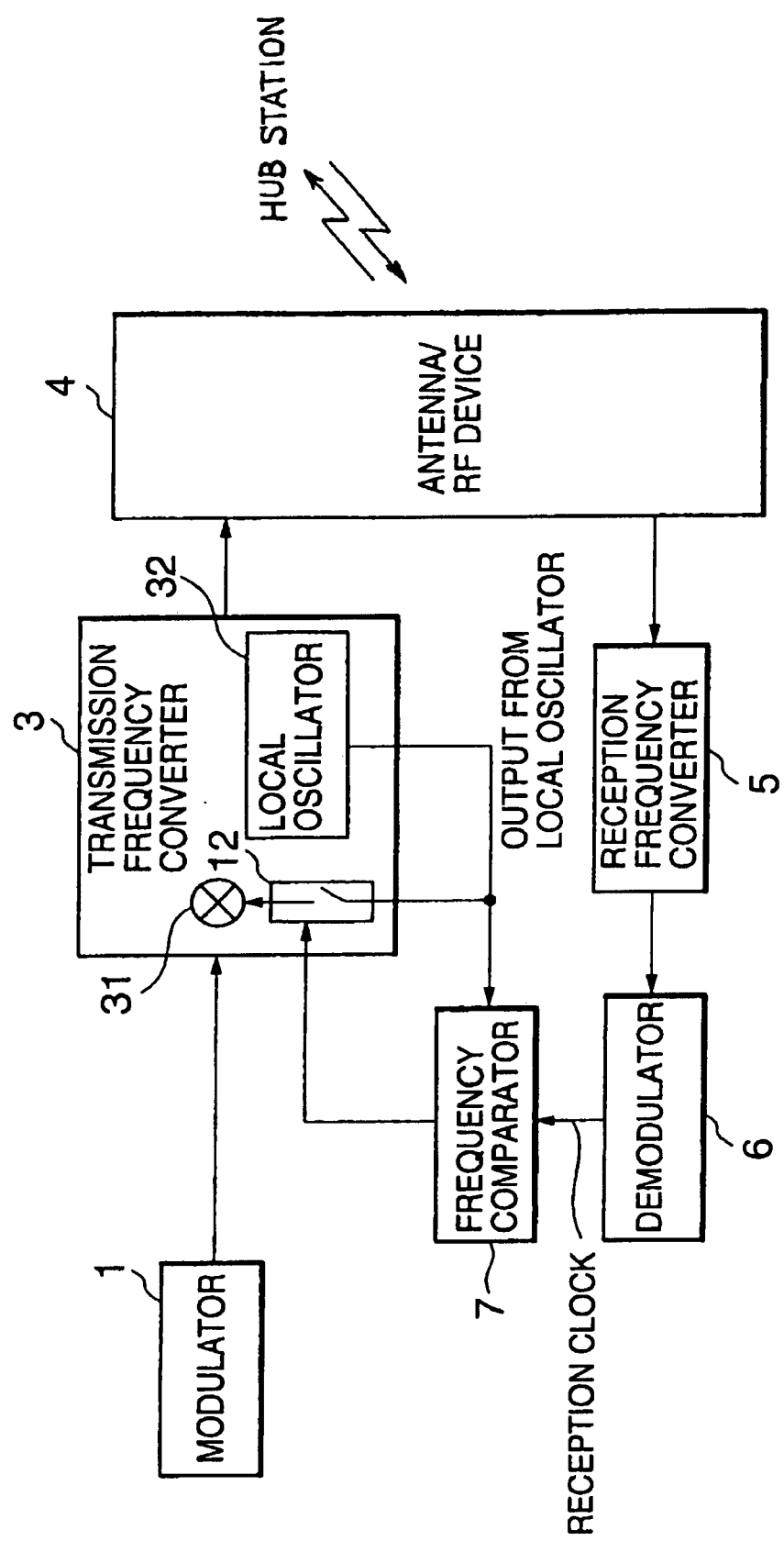
FIG. 8 is a block diagram showing another arrangement of the VSAT station in the satellite communication transmission control system of the present invention.
Figure 9:
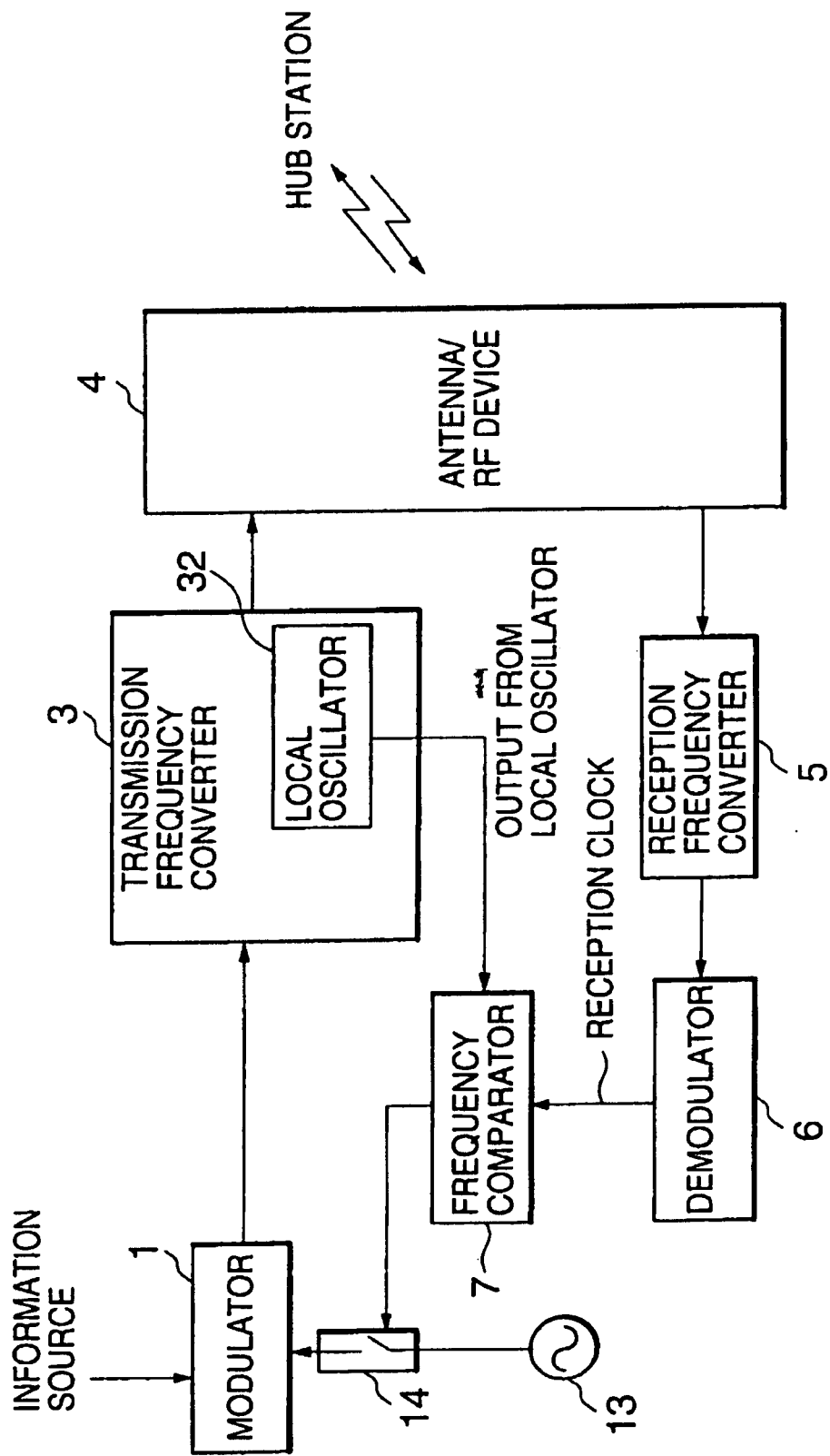
FIG. 9 is a block diagram showing still another arrangement of the VSAT station in the satellite communication transmission control system of the present invention.

FIGS. 8 and 9 are block diagrams showing other arrangement examples of the VSAT station used in the satellite communication transmission control system of the present invention. FIGS. 8 and 9 show other concrete means for stopping transmission of a modulated carrier. In the second arrangement example shown in FIG. 8, the transmission frequency converter 3 incorporates a frequency conversion mixer 31 for multiplying an output from the local oscillator 32 and a modulated wave from the modulator 1, as the means for stopping a modulated carrier from the transmission frequency converter 3 to the antenna/RF device 4. In addition, a switch 12 is inserted in the signal path of a local signal from the local oscillator 32 to the frequency conversion mixer 31. The local signal is ON/OFF-controlled by an output from the frequency comparator 7. In the third arrangement example shown in FIG. 9, a switch 14 is arranged on the output side of a modulator local oscillator 13 which is generally disposed in the modulator 1 for modulating baseband communication information. The switch 14 is so constituted as to ON/OFF-control a local oscillation signal having an intermediate frequency by an output from the frequency comparator 7.

As the means for stopping transmission of a modulated carrier, a switch for ON/OFF-controlling a modulated carrier can be interposed between the transmission frequency converter 3 and the antenna/RF device 4. Also, at least two of these switches can be combined. In short, the means for stopping transmission of a modulated carrier can be implemented by a function capable of stopping the modulated carrier itself.

A wide error range may be set for a large tolerance frequency error of the center frequency in the FDMA method in relation to the modulated carrier stop period. The tolerance range set in the frequency comparator can be freely set. With this arrangement, the time until the modulated carrier can be output can be changed in accordance the tolerance frequency error of the center frequency in the FDMA method.

What is claimed is:

1. A satellite communication transmission control system which comprises one central station, a plurality of small aperture terminals, and one communication satellite serving as a repeater for the central station and the aperture terminals, and performs communication via a frequency division multiple access communication channel, wherein the central station comprises a modulator for transmitting via a common channel a signal for controlling/monitoring the small aperture terminals on the basis of a stable clock signal, and each of the aperture terminals comprises a modulator for modulating communication information from an information source, a transmission frequency converter for frequency-converting a modulated wave from the modulator into a carrier signal (modulated carrier), an antenna/RF device for exchanging signals between the aperture terminal and the central station, a reception frequency converter for frequency-converting a modulated carrier from the central station, a demodulator for demodulating a signal received via the common channel out of a frequency-converted received signal and outputting a reception clock, and a frequency comparator for detecting a frequency error of a local oscillator arranged in the transmission frequency converter by using a clock signal from the demodulator as a reference upon power-on operation, and generating a control signal for stopping transmission of the modulated carrier until the frequency error falls within a preset tolerance range.

2. A system according to claim 1, wherein the small aperture terminal further comprises a switch arranged on an output side of the modulator, and the switch is kept off by the control signal from the frequency comparator until the frequency error falls within the preset error range.

3. A system according to claim 1, wherein the small aperture terminal further comprises a frequency conversion mixer arranged in the transmission frequency converter so as to multiply an output from the modulator by an output from the local oscillator, and a switch inserted in a signal path of a local signal from the local oscillator to the mixer, and the switch is kept off by the control signal from the frequency comparator until the frequency error falls within the preset error range.

4. A system according to claim 1, wherein the small aperture terminal further comprises a modulator local oscillator arranged for the modulator, and a switch inserted in a signal path of a local signal from the modulator local oscillator to the modulator, and the switch is kept off by the control signal from the frequency comparator until the frequency error falls within the preset error range.

5. A system according to claim 1, wherein the frequency comparator comprises a tolerance range setting unit for setting a frequency error range, a timer for setting a predetermined time specified by the clock signal as a gate ON period, a counter for counting outputs from the local oscillator in the gate ON period, and a comparator for comparing a count value of the counter with a preset tolerance range.

6. A system according to claim 1, wherein the local oscillator includes a synthesizer using a temperature-compensated crystal oscillator as an oscillation source, and outputs a multiplied output of the temperature-compensated crystal oscillator.

7. A small aperture terminal in a satellite communication transmission control system that is controlled/monitored by a signal based on a stable clock signal transmitted from one central station to a common channel of a satellite repeater and performs communication via a frequency division multiple access communication channel, comprising a modulator for modulating communication information from an information source, a transmission frequency converter for frequency-converting a modulated wave from said modulator into a carrier signal (modulated carrier), an antenna/RF device for exchanging signals between said aperture terminal and the central station, a reception frequency converter for frequency-converting a modulated carrier from the central station, a demodulator for demodulating a signal received via the common channel out of a frequency-converted received signal and outputting a reception clock, and a frequency comparator for detecting a frequency error of a local oscillator arranged in said transmission frequency converter by using a clock signal from said demodulator as a reference upon power-on operation, and generating a control signal for stopping transmission of the modulated carrier until the frequency error falls within a preset tolerance range.

8. A station according to claim 7, wherein said small aperture terminal further comprises a switch arranged on an output side of said modulator, and said switch is kept off by the control signal from said frequency comparator until the frequency error falls within the preset error range.

9. A station according to claim 7, wherein said small aperture terminal further comprises a frequency conversion mixer arranged in said transmission frequency converter so as to multiply an output from said modulator by an output from said local oscillator, and a switch inserted in a signal path of a local signal from said local oscillator to said mixer, and said switch is kept off by the control signal from said frequency comparator until the frequency error falls within the preset error range.

10. A station according to claim 7, wherein said small aperture terminal further comprises a modulator local oscillator arranged for said modulator, and a switch inserted in a signal path of a local signal from said modulator local oscillator to said modulator, and said switch is kept off by the control signal from said frequency comparator until the frequency error falls within the preset error range.

11. A station according to claim 7, wherein said frequency comparator comprises a tolerance range setting unit for setting a frequency error range, a timer for setting a predetermined time specified by the clock signal as a gate ON period, a counter for counting outputs from said local oscillator in the gate ON period, and a comparator for comparing a count value of said counter with a preset tolerance range.

12. A station according to claim 7, wherein said local oscillator includes a synthesizer using a temperature-compensated crystal oscillator as an oscillation source, and outputs a multiplied output of said temperature-compensated crystal oscillator.

13. A satellite communication transmission control system which comprises one central station, a plurality of small aperture terminals, and one communication satellite serving as a repeater for the central station and the aperture terminals, and performs communication via a frequency division multiple access communication channel, wherein the central station comprises a modulator for transmitting via a common channel a signal for controlling/monitoring the small aperture terminals on the basis of a stable clock signal, and each of the aperture terminals comprises a modulator for modulating communication information from an information source, a transmission frequency converter for frequency-converting a modulated wave from the modulator into a carrier signal (modulated carrier), an antenna/RE device for exchanging signals between the aperture terminal and the central station, a reception frequency converter for frequency-converting a modulated carrier from the central station, a demodulator for demodulating a signal received via the common channel out of a frequency-converted received signal and outputting a reception clock, and a frequency comparator for detecting a frequency error of an oven controlled crystal oscillator (OCXO) arranged in the transmission frequency converter by using a clock signal from the demodulator as a reference upon power-on operation, and generating a control signal for stopping transmission of the modulated carrier until the frequency error falls within a preset tolerance range.

* * * * *